June 9, 1931.  R. S. SANFORD  1,809,069
VEHICLE HAVING BRAKES
Filed Jan. 8, 1926   2 Sheets-Sheet 1

INVENTOR
ROY S. SANFORD
BY
M.W. McConkey
ATTORNEY

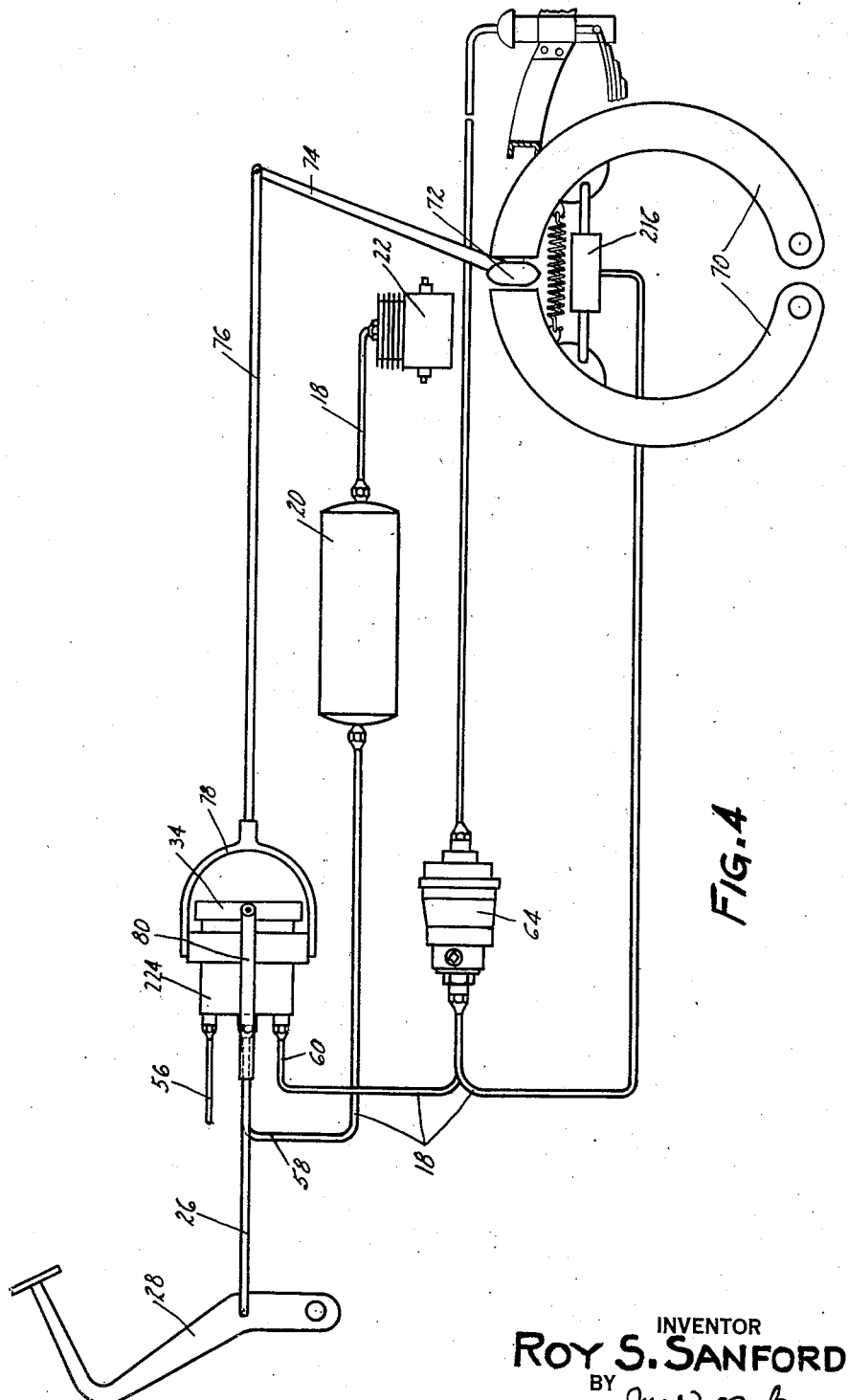

Patented June 9, 1931

1,809,069

UNITED STATES PATENT OFFICE

ROY S. SANFORD, OF SOUTH BEND, INDIANA, ASSIGNOR TO BENDIX BRAKE COMPANY, OF SOUTH BEND, INDIANA, A CORPORATION OF ILLINOIS

VEHICLE HAVING BRAKES

Application filed January 8, 1926. Serial No. 79,952.

This invention relates to brakes, and is illustrated as embodied in an automobile bus chassis having novel system of fluid-power-operated brakes.

An important feature of the invention relates to limiting the power that can be applied to the brakes according to the load on the vehicle. Preferably this is accomplished by an automatic controlling device, such as a novel valve, operated according to the distortion by the load of an elastic medium such as the column of air in a pneumatic shock absorber.

Other features relate to a novel arrangement for limiting the pressure that can be applied by power according to the wear of the brakes, to warn the driver of excessive wear before the auxiliary manually-operated connections are rendered inoperative, and to a novel valve arrangement when the invention is embodied in an air brake, and to other new combinations of parts and desirable particular constructions which will be apparent from the following description of the illustrative embodiments shown in the accompanying drawings, in which:

Fig. 4 is a diagrammatic side elevation of another arrangement of the parts, in which the braking pressure is additionally limited according to the wear of the brakes.

Figure 1:
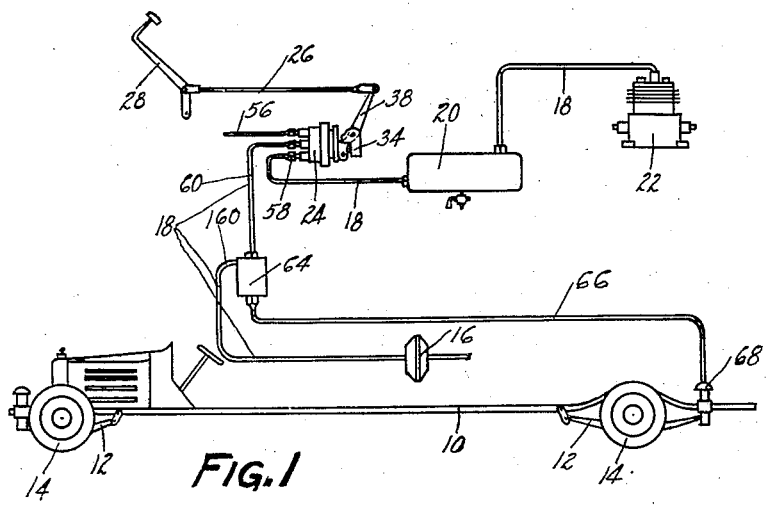
Fig. 1 is a diagrammatic side elevation showing the connection of the parts to have the pressure limited variably according to the load.

In the arrangement of Fig. 1, the vehicle includes a chassis frame 10, supported by springs 12 on axles having wheels 14 provided with brakes. The brakes are operated by any suitable mechanical connections from a diaphragm operator 16 of a well-known type, or an equivalent device, operated by compressed air passing through a system 18 of conduits from a reservoir 20 kept filled by a suitable compressor 22.

Figure 2:
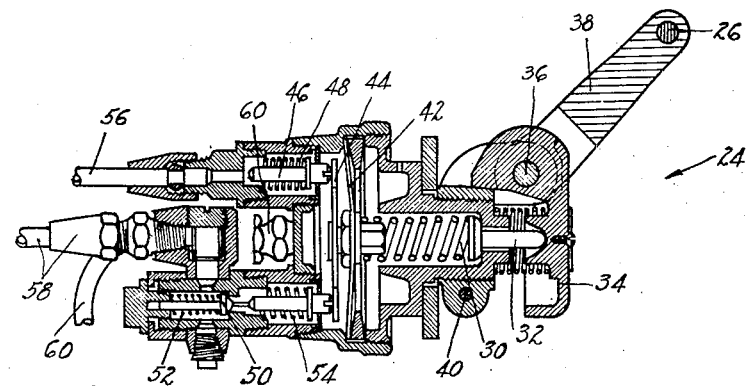
Fig. 2 is a section through the driver-operated controlling valve.

The application of air pressure to the brakes is shown as controlled by a valve 24 operated by a link 26 from the brake pedal 28. Valve 24 is shown in section in Fig. 2, and includes a spring 30 compressed by a plunger 32 engaged by a head 34 slidably fitting over the end of the valve, the head being pivoted at 36 to a yoke lever 38 fulcrumed at 40 on the valve housing and connected to the link 26.

Spring 30 when compressed acts on a diaphragm 42 in a direction tending to move to the left a centrally pivoting rocker bar 44. Pressure on the rocker bar causes it to close an exhaust valve 46 against the resistance of its spring 48, and to open an intake valve 50 against he resistance of its spring 52. The exhaust valve spring 48 holds the valve against the rocker bar, while an auxiliary spring 54, stronger than spring 52, holds the intake valve against the rocker bar. Exhaust valve 46 controls an exhaust conduit 56 leading to the atmosphere, while intake valve 50 controls an intake conduit 58 forming part of the conduits 18 and leading from reservoir 20. The outlet from the valve is at 60, in the central plane of the valve in Fig. 2, and therefore arranged behind conduit 58, but opening from the air chamber at the left of the diaphragm 42 at the lower end of the diameter which in this view is perpendicular to the paper. Conduit 60 forms part of the system 18, and leads toward the operator 16.

By the above-described arrangement, depression of pedal 28 compresses spring 30, closing exhaust valve 46 and opening intake valve 50, thus applying the brakes. When the pressure on the brakes balances the pressure of spring 30 on the diaphragm 42, spring 54 is allowed to close intake valve 50 again without affecting exhaust valve 46, this being permitted by the rocking of bar 44. Further depression of pedal 28 will repeat the above operations, increasing the pressure on the brakes. Release of pedal 28 permits spring 48 to open the exhaust valve 46, the intake valve 50 already being closed, thus relieving the pressure on the brakes.

Figure 3:
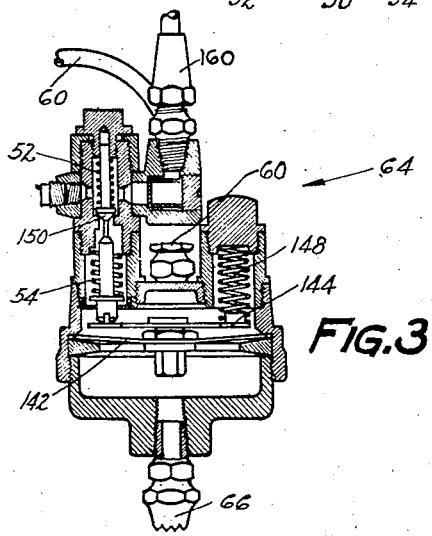
Fig. 3 is a section through the load-controlled valve.

According to one embodiment of an important feature of the invention, there is interposed between the controlling valve 24 and the operator 16, a novel load-controlled pressure-limiting or governor valve 64, showing in section in Fig. 3. In this particular embodiment, the load on the vehicle (or the distortion of springs 12, which is a function of the load), is measured by the compression of an elastic medium such as the column of air in a conduit 66 leading from a shock absorber 68 of any usual and desired air-pressure type. As no modification of the shock absorber is necessary, it is not illustrated in detail, the one shown comprising an air-compressing cylinder and piston connected respectively to the chassis frame 10 and spring 12.

The air compressed in conduit 66 acts on a diaphragm 142 in valve 64. This diaphragm acts on a rocker bar 144, yieldingly fulcrumed at one end on a spring 148. The other end of the rocker bar acts on a control valve 150 controlling the outlet 160 from valve 64 leading to the brake operator 16.

The air compressed in conduit 66 thus acts through diaphragm 142 to hold valve 150 open until the pressure on the brakes reaches a maximum amount which is a function of the load on the vehicle, whereupon valve 150 is closed automatically, preventing further pressure on the brakes. Thus the greater the load on the vehicle, and therefore the greater the traction of the wheels on the road, the greater the pressure that can be applied to the brakes.

In the arrangement of Fig. 4, the fluid-power operators 216 act directly on the brakes 70, which can also be applied manually by means such as cams 72 operated by levers 74 and links 76.

Valve 224 in this arrangement differs from valve 24 only that it is pivoted to a yoke 78 connected to link 76, while head 34 is pivoted to a yoke 80 connected to the link 26 from pedal 28. Thus the valve forms a tension element in the manual connections by which the brakes are applied when there is no air in reservoir 20.

When the air is on, however, depression of pedal 28 opens valve 224, as in the first modification, and operators 216 apply the brakes up to the maximum pressure determined by valve 64. However, as the brakes go on, cams 72 follow them, and pedal 28 must be further depressed, although without any substantial additional effort, to hold the brakes on. Thus, if the brakes are so worn that they cannot be manually applied by cams 72 when the power is off, pedal 28 will reach the floor board before the brakes are fully applied by power, thus warning the driver to reline his brakes immediately.

While two illustrative arrangements have been described in detail, it is not my intention to limit the scope of the invention to those particular arrangements, or otherwise than by the terms of the appended claims.

I claim:

1. A vehicle having, in combination, brakes, primary brake-applying means, a shock absorber arranged to control the pressure applied to the brakes by said means, auxiliary brake-applying means, and a device controlled by the auxiliary means and limiting the pressure applied by the primary means.

2. A vehicle having, in combination, brakes, power brake-applying means, auxiliary driver-operated manual brake-applying means, a device controlled by the auxiliary means for limiting the pressure applied to the brakes by the power means, and means controlled by the load on the vehicle for additionally limiting the pressure applied to the brakes by the power means.

3. A vehicle having, in combination, brakes, power brake-applying means, auxiliary driver-operated manual brake-applying means, a device controlled by the auxiliary means for limiting the pressure applied to the brakes by the power means, and a separate device controlled by the load on the vehicle for independently limiting the pressure applied to the brakes by the power means.

4. A vehicle having, in combination, brakes, fluid-power brake-applying means including two pressure-limiting valves, auxiliary manually-operated brake-applying means arranged to control one of said valves, and means measuring the load on the vehicle and controlling the other of said valves.

5. A vehicle having, in combination, brakes, fluid-power brake-applying means including two pressure-limiting valves, means measuring the wear of the brakes and arranged to control one of said valves, and means measuring the load on the vehicle and controlling the other of said valves.

6. A vehicle having, in combination, brakes, brake-applying means including two pressure-limiting devices, means for measuring the wear of the brakes and arranged to control one of said devices, and means for measuring the load on the vehicle and controlling the other of said devices.

7. A vehicle having, in combination, brakes, driver-controlled power-operated brake-applying means including pressure-limiting means, means for measuring the wear of the brakes and arranged to limit the pressure on the brakes, and means for measuring the load on the vehicle and also arranged to limit the pressure on the brakes.

8. A vehicle having, in combination, a brake, a device engaging and applying the brake, power means separate from said device for applying the brake, a driver-operated controlling member, connections from said member to the brake-applying device including as a connecting element a device controlling the power means, and means controlled by the load on the vehicle and acting on the power means between the brake and the connecting element to limit the pressure on the brake.

9. A vehicle having, in combination, a brake, a device engaging and applying the brake, fluid-power means separate from said device for applying the brake, a driver-operated controlling member, connections from said member to the brake-applying device including as a connecting element a valve controlling the power means, and another valve controlled by the load on the vehicle and acting on the power means between the brake and the first valve to limit the pressure on the brake.

10. A vehicle having, in combination, a brake, a brake-applying and engaging device, a driver-operated controlling member, connections from said member to said device, fluid-power brake-applying means acting on the brake separately from said device, a valve controlling the fluid power means, and a spring arranged to be compressed by tension on said connections to open the valve.

11. A vehicle having, in combination, a brake, a brake-applying and engaging device, a driver-operated controlling member, connections from said member to said device, fluid-power brake-applying means acting on the brake separately from said device, a valve controlling the fluid power means, a spring arranged to be compressed by tension on said connections to open the valve, and means operated by the pressure on the brake through the fluid power means tending to overcome the spring and close the valve again.

12. A vehicle having, in combination, a brake, a brake-applying and engaging device, a driver-operated controlling member, connections from said member to said device, fluid-power brake-applying means acting on the brake separately from said device, a valve controlling the fluid power means, a spring arranged to be compressed by tension on said connections to open the valve, and means operated by the pressure on the brake through the fluid power means tending to overcome the spring and close the valve again, together with an exhaust valve for said fluid power means which is automatically opened when the pressure on the brake exceeds the pressure on said spring.

13. A vehicle having supporting springs, a chassis frame, and brakes and comprising, in combination therewith, brake applying means, a pneumatic shock absorber unit and means including said shock absorber unit for automatically and variably controlling the pressure applied to said brakes by said brake applying means according to the weight on the springs.

14. An automotive vehicle having a chassis frame, supporting springs and brakes, and comprising, in combination therewith, brake applying means, an air controlled governor means, a pneumatic shock absorber having a part secured to the frame and a part secured to one of the springs and serving, in cooperation with said governor means, to automatically and variably limit the pressure applied to the brakes by said brake applying means according to the force necessary to support the weight on the springs.

15. An automotive vehicle having a chassis frame, supporting springs and brakes and comprising, in combination therewith, brake applying means, a separate pneumatic shock absorber unit having a part secured to the frame and a part secured to one of the springs and means including said shock absorber unit for automatically and variably limiting the pressure applied to the brakes by said first-mentioned means according to the load on said unit.

16. A vehicle having brakes and comprising, in combination therewith, fluid power brake applying means including a pedal actuated fluid power control valve, a pneumatic shock absorber unit and means controlled by the shock absorber unit and controlling said first-mentioned control valve for automatically and variably limiting the pressure on the brakes according to the load on the unit.

In testimony whereof, I have hereunto signed my name.

ROY S. SANFORD.